United States Patent [19]

Chen

[11] Patent Number: 5,048,369
[45] Date of Patent: Sep. 17, 1991

[54] CLIPLESS PEDAL WITH FASTENING MEANS

[76] Inventor: Chung-I Chen, No. 3, Kung-Chi Rd., Yu-Shih Industry Dist., Ta-Chia Chen, Taichung Hsien, Taiwan

[21] Appl. No.: 486,547

[22] Filed: Feb. 28, 1990

[51] Int. Cl.$^5$ .............................................. G05G 1/14
[52] U.S. Cl. .................................................. 74/594.6
[58] Field of Search ............... 74/594.1, 594.4, 594.6, 74/560; 36/131

[56] References Cited

U.S. PATENT DOCUMENTS

| | | | |
|---|---|---|---|
| 4,488,453 | 12/1984 | Drugeon et al. | 74/594.6 |
| 4,686,867 | 8/1987 | Bernard et al. | 74/594.4 X |
| 4,893,420 | 1/1990 | Bezin et al. | 36/131 |
| 4,928,549 | 5/1990 | Nagano | 74/594.4 X |

FOREIGN PATENT DOCUMENTS

| | | | |
|---|---|---|---|
| 2401823 | 3/1979 | France | 74/594.6 |
| 2561502 | 9/1985 | France | 74/594.6 |

Primary Examiner—Rodney M. Lindsey
Attorney, Agent, or Firm—Ashen Martin Seldon Lippman & Scillieri

[57] ABSTRACT

A clipless pedal is disclosed herein which includes a mounting support fixed to a shoe sole and a pedal body which is rotatably mountable to a conventional pedal shaft for retaining the mounting support. The pedal body has a pair of rear jaw members which revertably engage the pedal body. The pedal body, mounting support and rear jaw members all have surfaces shaped in such a manner to ensure the mounting support is rotatable and can push the rear jaw members to allow a lateral disengagement of the mounting support from the pedal body. The rear jaw members are each coupled to the pedal body by a screw member which passes through the jaw member into a respective slot in a V-shaped groove formed in the pedal body. A spring member circumvents the screw member for revertable force against the jaw. The slots are preferably of different lengths so that one jaw member can move a greater distance than the other whereby sufficient rotation for lateral disengagement is more readily attained when rotation is of the cyclist's heel in the outward direction rather than the inward direction.

9 Claims, 8 Drawing Sheets

CLIPLESS PEDAL WITH FASTENING MEANS

BACKGROUND OF THE INVENTION

This invention relates to a bicycle pedal, more particularly to a pedal device for fastening a cyclist's shoe to the bicycle pedal.

Devices of this type which permit easy positioning and rapid disengagement of the shoe on a pedal without manual intervention are known in prior art. The most recent of these devices is U.S. Pat. No. 4,686,867, which comprise a mounting support secured to the sole of the shoe and a pedal provided with a movable claw found at the rear end for retaining the mounting support. The force required to free the mounting support from the movable claw can be varied by the rotation of a knurled nut found on the pedal body. A main drawback of this design is that the retaining means is entirely dependent on the movable claw and the knurled nut. In the above mentioned design, the movable claw is exposed to the elements and risks the possibility of damage. Should any loose threading of the knurled nut occur or should any portion of the claw accidentally break off, the device cannot be relied upon anymore.

SUMMARY OF THE INVENTION

An object of this invention is to provide a clipless pedal with fastening means to overcome the disadvantages mentioned in the foregoing.

Another object of this invention is to provide a cushion means between the shoe sole and the mounting support, thus making the device more comfortable to the user.

Accordingly, a clipless pedal of this invention includes a mounting support fixed beneath the sole of a shoe and a pedal body rotatably mounted to a conventional pedal shaft for retaining the mounting support. The mounting support has a circular protrusion which is received by a recessed concave wall of the pedal body, thus allowing the mounting support to move within a certain angular range without any untimely disengagement occurring. The pedal body has movable rear jaw members which allow the disengagement of the mounting support from the pedal body only when the heel of the foot makes an upward lateral thrust in a direction away from the pedal shaft. A cushion is preferably added to the mounting support to make the device more comfortable to the user.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
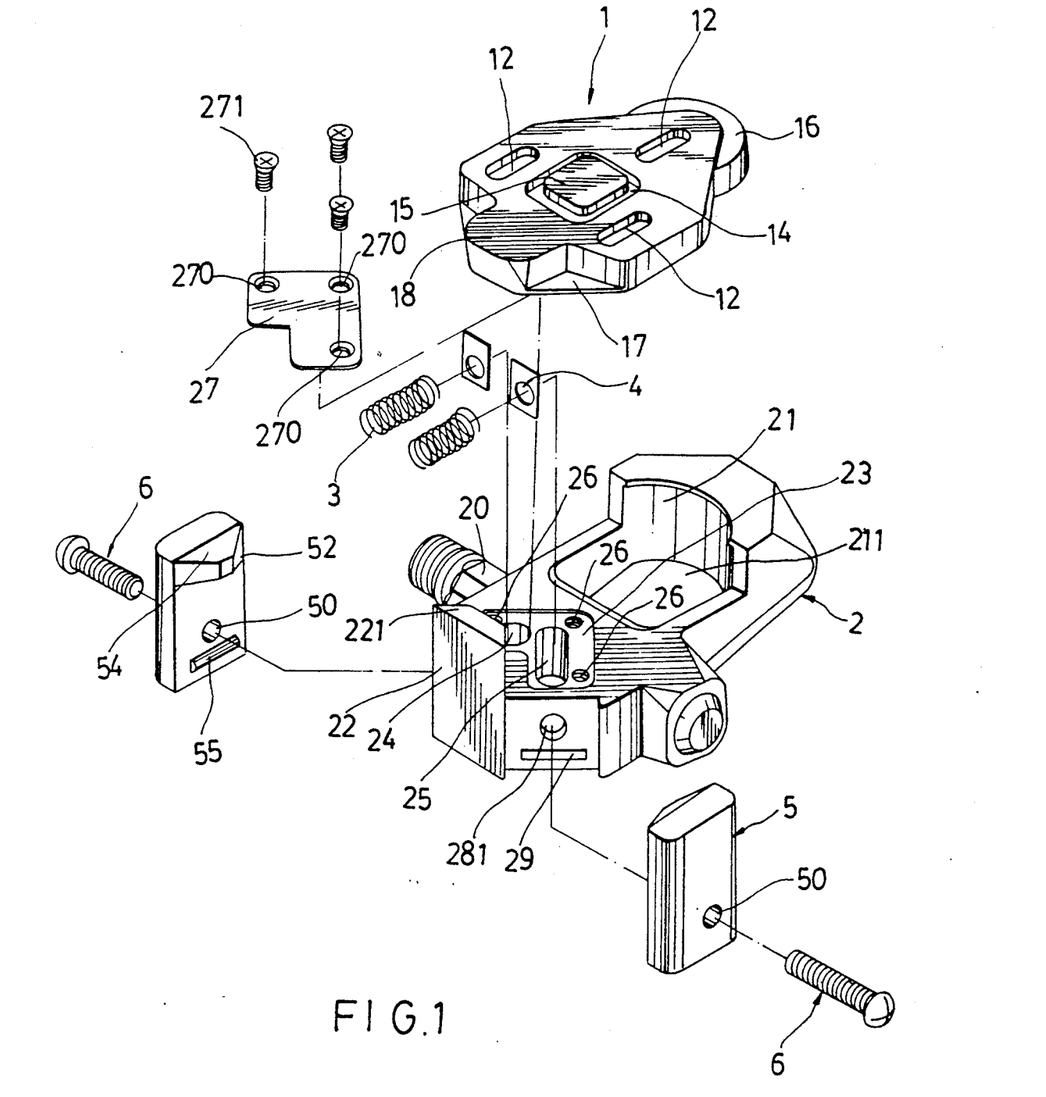
FIG. 1 is an exploded perspective view of the preferred embodiment.

The preferred embodiment of this invention as shown in FIG. 1 mainly comprises a mounting support 1, a pedal body 2, a pair of spring members 3, a pair of bolt members 4, a pair of rear jaw members 5 and a pair of screws 6.

Figure 2:
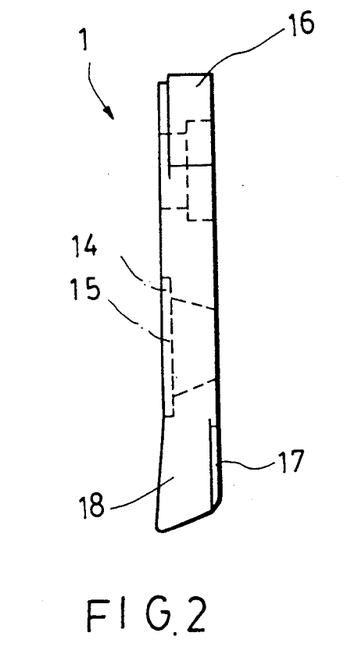
FIG. 2 is a side view of a part of the preferred embodiment.
Figure 8:
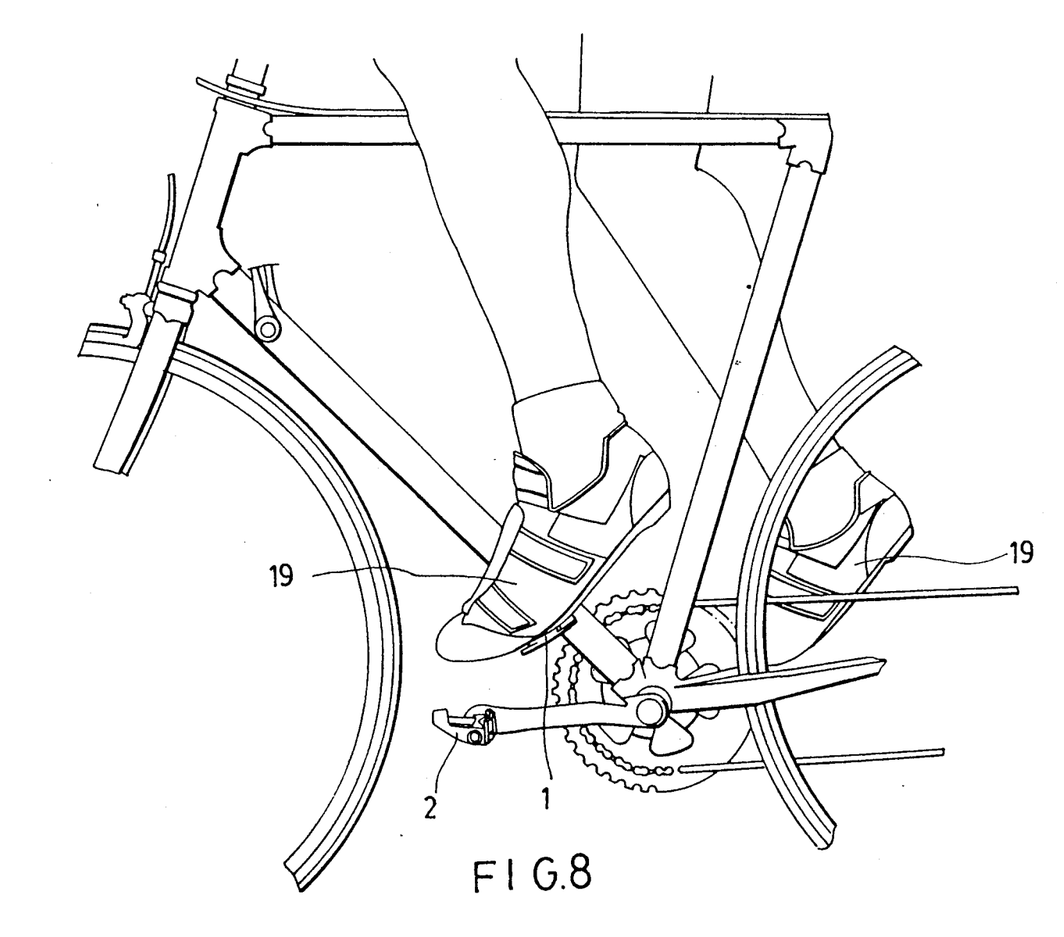
FIG. 8 illustrates the preferred embodiment in use.

The mounting support 1, symmetrical in shape to a transverse axis, has a substantially triangular front end and a substantially rectangular rear end. The mounting support 1 is attached to the sole of a cyclist's shoe 19 by means of sunk-head screws passed through first elongated slots 12, which permit adjustment of the mounting support 1 in a longitudinal direction. A rectangular groove 14 is formed at the center of mounting support 1 and houses a rectangular cushion member 15. The cushion member 15, designed to have a tapering bottom edge, is made of a plastic material and provides a cushioning effect between the cyclist's shoe 19 (FIG. 8) and the mounting support 1. The front end of the mounting support 1 has a circular protrusion 16 opposite a substantially rectangular wedge protrusion 18 located at the rear end. The rectangular wedge protrusion 18 has a top surface which inclines slightly downwards with respect to the mounting support 1. The mounting support 1 also includes a pair of triangular flange members 17, each of which has one side on the rectangular wedge protrusion 18 and another side on the substantially rectangular rear end of the mounting support 1. A side view of the mounting support 1 can be found in FIG. 2. The mounting support 1 has a flat bottom surface.

The pedal body 2, which is rotatably mounted to a conventional pedal shaft 20, is provided with a fixed claw 21 which forms a concave wall at the front end. A substantially inverted U-shaped groove 211, formed in the pedal body 2, faces the fixed claw 21 and is partially covered by a slight projection of the top edge of the fixed claw 21. The rear end of the pedal body 2 is substantially trapezoidal in shape, with a flat central portion and two inclined sides. A support member 22, formed as a rectangular block with a top surface 221 which is a trapezoid inclining downwards with respect to the pedal body 2, is fixed to the flat portion of the rear end of the pedal body 2. A substantially V-shaped groove 23 on the pedal body 2, has two ends perpendicular to the inclined sides of the rear end of the pedal body 2 and second elongated slots 24, 25 formed therein. For a right foot pedal body, the slot 25 is made longer than the slot 24, which is closer to the instep portion of the pedal body, and the same is done for a left foot pedal body. A spring member 3 is longitudinally disposed in each of the second elongated slots 24, 25. A thin plate 27, having three screw holes 270, is the same size and shape as the V-shaped groove 23 and covers the V-shaped groove 23 through three screws 271 threaded to the three screw holes 26 on the V-shaped groove 24. A hole 280, which communicates with the slot 24, is formed on one inclined side of the rear end of pedal body 2 and another hole 281, which communicates with the slot 25, is formed on the other inclined side. A longitudinal slot 29 is formed on each of the said inclined sides, below holes 280, 281.

A rear jaw member 5, substantially shaped as a rectangular block, has a hole 50 and a longitudinal guiding protrusion 55 for engaging with one of the inclined sides of the rear end of pedal body 2. The rear jaw member 5 has a protrusion 52, which is roughly shaped as a pyramid with the rectangular base fixed to the upper portion of the side wall and a square section opposite the rectangular base. The rear jaw member 5 is engaged to the pedal body 2 by a screw member 6 passing through the hole 50 of rear jaw member 5 and the hole 28 of pedal body 2. The spring member 3 surrounds the entire length of the screw 6 inside the pedal body 2. A bolt member 4 holds the spring member 3 in place with the screw member 6. The longitudinal guiding protrusion 55 is received by the longitudinal slot 29 of the pedal body 2.

Figure 3:
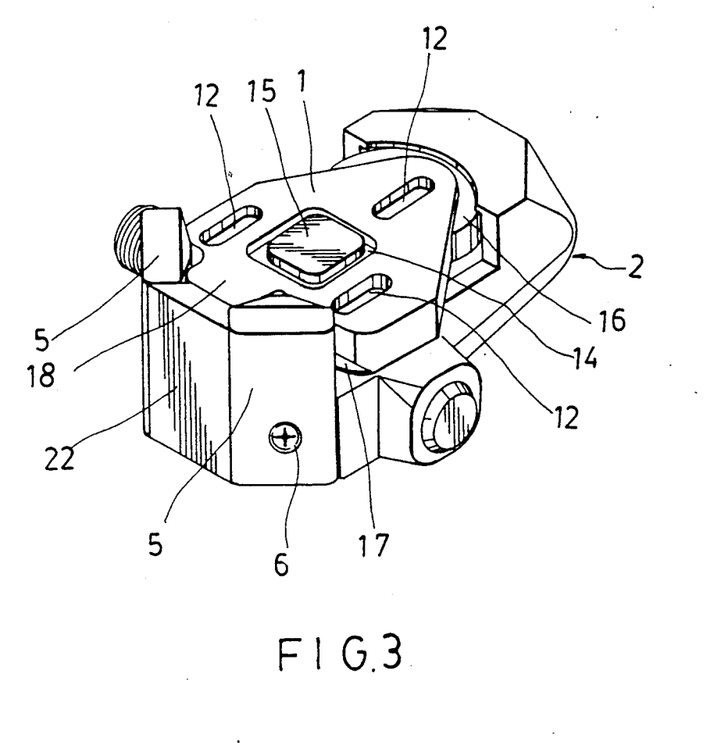
FIG. 3 illustrates the embodiment in its assembled form.
Figure 4:
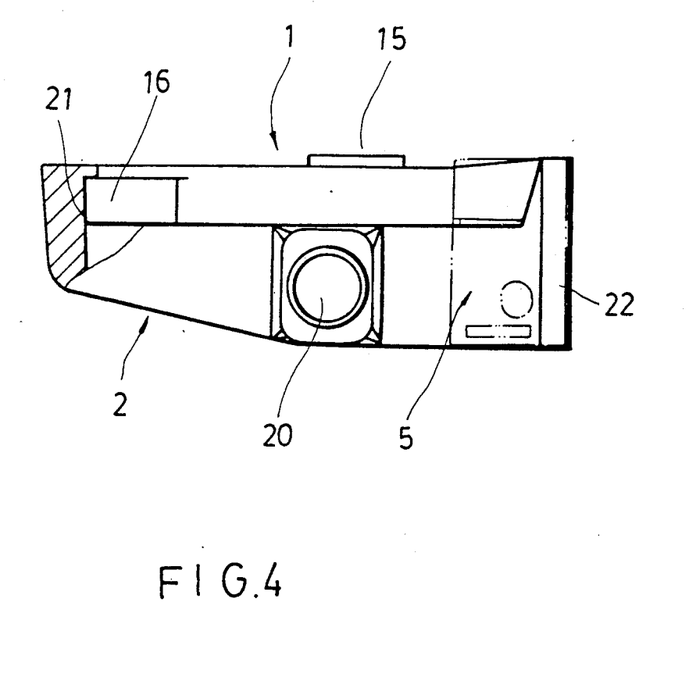
FIG. 4 shows a side view of the embodiment in FIG. 3.

The embodiment is shown in its assembled form in FIG. 3. The protrusion 16 of the mounting body 1 is received by the fixed claw 21 and is partially covered by the top edge of the pedal body 2. During the engagement procedure, the rectangular wedge protrusion 18 slides against the top surface 221 of the support member 22 and the flange members 17 push the rear jaw members 5 away. When engaged, the rear jaw members 5 revert to their original positions, with the protrusions 52 now resting on the flange members 17. FIG. 4 shows a side view of the mounting support 1 received by the pedal body 2.

During normal pedaling, the fixed claw 21, the support member 22 and the rear jaw members 5 allow the mounting support 1 to move about in a certain angle without any disengagement occurring. Any forwardly directed force by the foot is absorbed by the fixed claw 21. The rearwardly directed forces are absorbed by the support member 22 or any of the rear jaw members 5. The upwardly directed forces are absorbed by the fixed claw 21 and the protrusion 52 of the rear jaw members 5. All downwardly directed forces are absorbed by the pedal body itself and those forces directed to the sides are absorbed by the rear jaw members 5.

Figure 5:
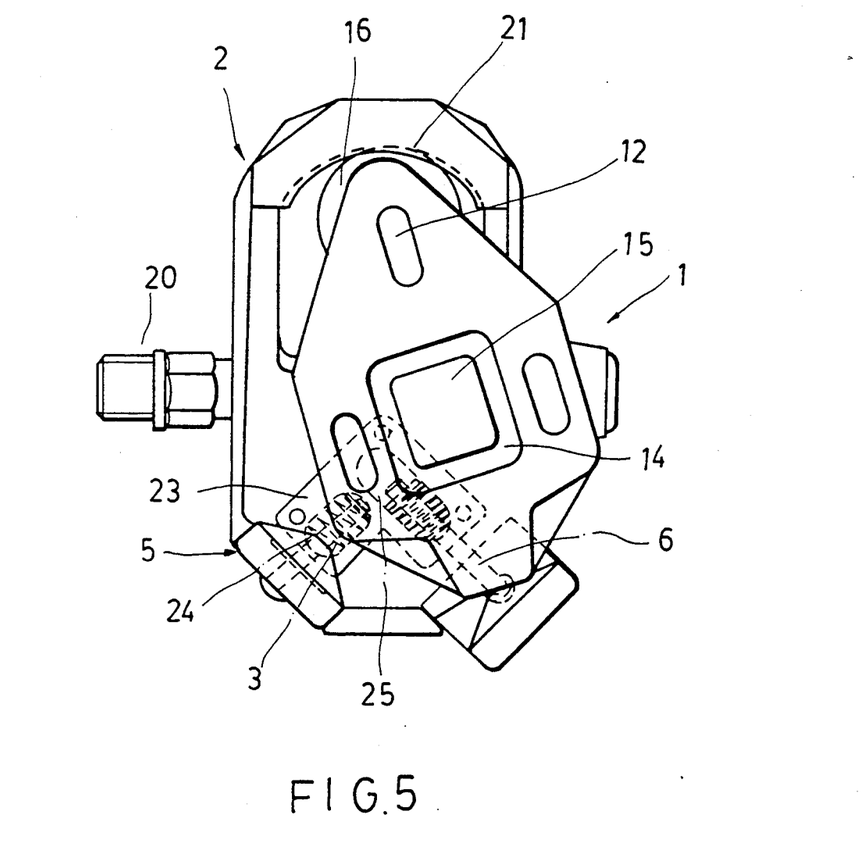
FIGS. 5, 6 show movements for disengagement of the shoe.
Figure 6:
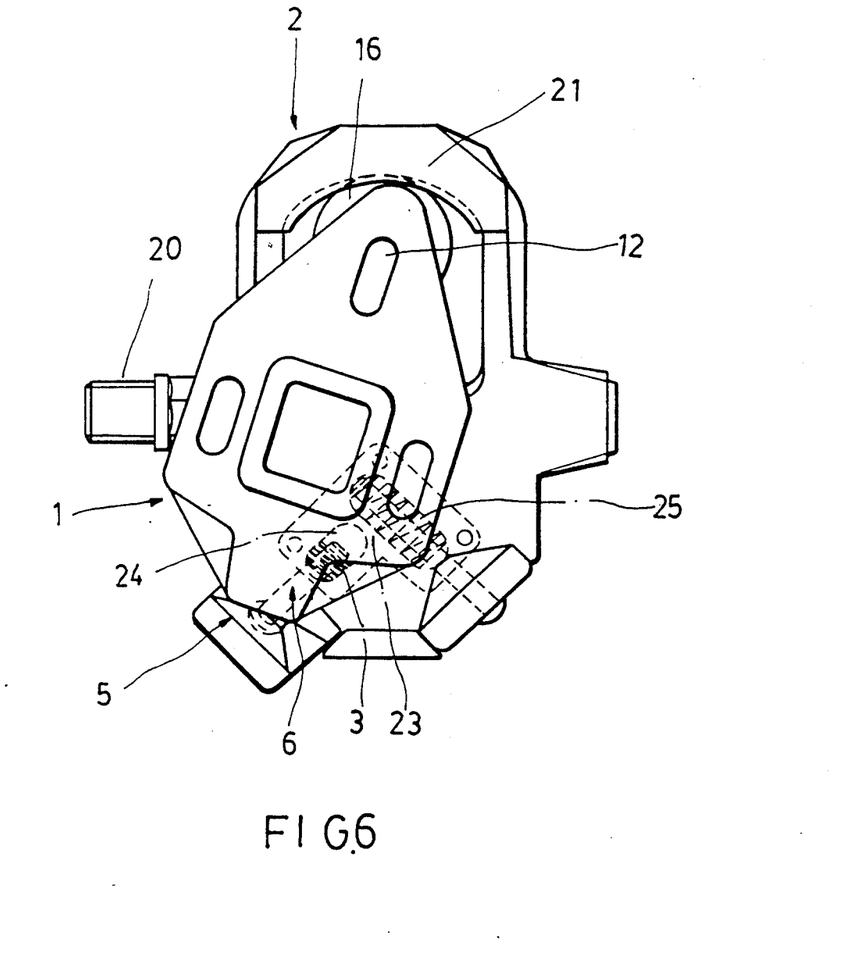

Removal of the mounting support 1 from the pedal body 2 is done by a lateral upward thrust with the heel of the foot in a direction away from the pedal shaft 20. FIG. 5 illustrates a movement for disengaging the mounting support 1 from the pedal body 2. It is not easy to disengage the mounting support 1 by applying a lateral upward thrust in a direction towards the pedal shaft 20 because the shorter slot 24 allows a more limited amount of movement. FIG. 6 shows the mounting support 1 moving in this direction.

Figure 7:
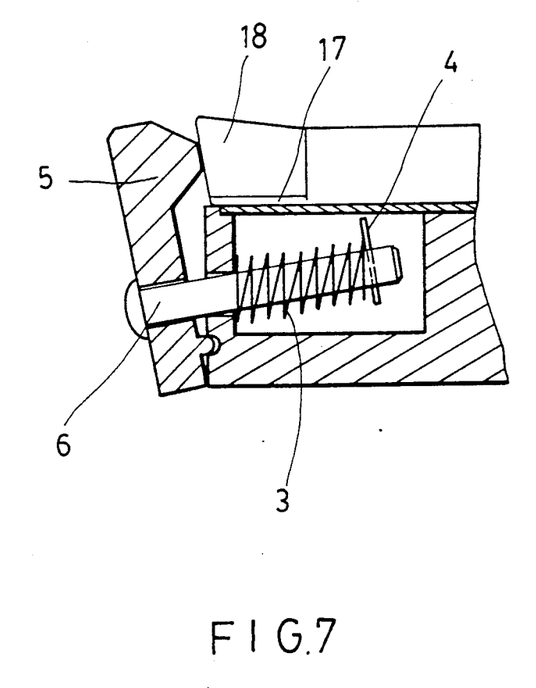
FIG. 7 shows the action of a spring member during disengagement.

In FIG. 7, the spring member 3, during the disengagement procedure, is compressed due to the pulling force exerted on the screw member 6. The longitudinal guiding protrusion 55 of the rear jaw member 5 and the longitudinal slot 29 keep said rear jaw member 5 in contact with the pedal body 2 to guide said rear jaw member 5 when it returns to its original position.

While this invention has been described in connection with what is considered the most practical and preferred embodiment, it is understood that the invention is not limited to the disclosed embodiments, but is intended to cover various arrangements included within the spirit and scope of the broadest interpretation so as to encompass all such modifications and equivalent arrangements.

I claim:

1. An improved clipless pedal having a mounting support for fixing to a shoe sole, and a pedal body rotatively mounted to a conventional pedal shaft and comprising retaining means for said mounting support wherein the improvement comprises:
   said pedal body has a substantially trapezoidal rear end having a generally flat portion and two inclined sides, a support member fixed to the flat portion and a pair of rear jaw members having means for revertably engaging with said pedal body at the included sides,
   said pedal body, said mounting support, said support member and said pair of rear jaw members having surfaces shaped in such a manner to ensure said mounting support is rotatable and can push said rear jaw members to allow a lateral disengagement of said mounting support from said pedal body;
   the pedal body further including a substantially V-shaped groove, the two ends of said groove being perpendicular to said included sides of the rear end of said pedal body, said V-shaped groove having two elongated slots formed along its length,
   and a first hole formed on each said included side and communicating with said elongated slots,
   the rear jaw members further including a second hole aligned with the first hole of the engaged inclined side, and
   said means for revertably engaging said rear jaw members including
   a pair of screw members, each adapted to pass through said first and second holes so as to be longitudinally disposed inside a respective elongated slot of the V-shaped groove,
   a pair of spring members, each longitudinally disposed inside a respective elongated slot and surrounding the length of the screw member therein,
   and a pair of bolt members respectively positioned within the two elongated slots to threadably engage the screw member therein and hold the respective spring member in place.

2. The improved clipless pedal as claimed in claim 1, wherein the two elongated slots of said V-groove have different lengths.

3. An improved clipless pedal as claimed in claim 2, further comprising a thin plate being adapted to cover said V-shaped groove.

4. An improved clipless pedal as claimed in claim 3, wherein said mounting support further comprises a substantially rectangular rear end, a rectangular wedge protrusion located at said rear end, and a pair of triangular flange members, each of which has one side on said rectangular wedge protrusion and another side on said rectangular rear end; and
   each of said rear jaw members further comprises a first protrusion roughly shaped as a pyramid with a rectangular base fixed to the upper section of the side wall of said rear jaw member, having a square section opposite the rectangular base, whereby said first protrusions rest on said flange members when said mounting support is received by said pedal body.

5. An improved clipless pedal as claimed in claim 4, wherein each said rear jaw members further comprises a longitudinal guiding protrusion below said second hole, and said pedal body has longitudinal slots for receiving said longitudinal guiding protrusions of said rear jaw members, whereby said longitudinal slots and said longitudinal guiding protrusions help said rear jaw members revert to their original positions.

6. An improved clipless pedal as claimed in claim 5, wherein said mounting support further comprises a cushion member to act as a cushion between the shoe sole and said mounting support.

7. The improved clipless pedal of claim 2 wherein the pedal body is configures so that the shorter of the elongated slots lies closer to an instep portion of the pedal body than the longer of the elongated slots.

8. The clipless pedal of claim 1 wherein the pedal body further includes a fixed claw (21) forming a concave wall at the front end of the pedal body.

9. The clipless pedal as claimed in claim 8 wherein the pedal body further includes a substantially inverted U-shaped groove (211).

* * * * *